US012570256B2

(12) United States Patent
Marx et al.

(10) Patent No.: US 12,570,256 B2
(45) Date of Patent: Mar. 10, 2026

(54) METHOD FOR OPERATING A BRAKING SYSTEM FOR A MOTOR VEHICLE, BRAKING SYSTEM AND METHOD FOR CONTROLLING IT, COMPUTER PROGRAM PRODUCT, CONTROL UNIT AND MOTOR VEHICLE

(71) Applicant: ZF Active Safety GmbH, Koblenz (DE)

(72) Inventors: Andreas Marx, Hartenfels (DE);
Nicholas Alford, Waldesch (DE);
Roman Bechmann, Koblenz (DE)

(73) Assignee: ZF Active Safety Gmbh, Koblenz (DE)

( * ) Notice: Subject to any disclaimer, the term of this patent is extended or adjusted under 35 U.S.C. 154(b) by 92 days.

(21) Appl. No.: 18/509,752

(22) Filed: Nov. 15, 2023

(65) Prior Publication Data

US 2024/0157921 A1      May 16, 2024

(30) Foreign Application Priority Data

Nov. 15, 2022    (DE) .......................... 102022130192.3

(51) Int. Cl.

| | |
|---|---|
| *B60T 8/30* | (2006.01) |
| *B60T 8/24* | (2006.01) |
| *B60T 8/88* | (2006.01) |
| *B60T 8/92* | (2006.01) |
| *B60T 17/18* | (2006.01) |
| *B60T 13/74* | (2006.01) |

(52) U.S. Cl.
CPC ................ *B60T 8/30* (2013.01); *B60T 8/245* (2013.01); *B60T 8/885* (2013.01); *B60T 8/92* (2013.01); *B60T 17/18* (2013.01); *B60T 13/746* (2013.01); *B60T 2210/20* (2013.01); *B60T 2250/02* (2013.01)

(58) Field of Classification Search
CPC . B60T 8/30; B60T 8/245; B60T 8/885; B60T 8/92; B60T 8/17; B60T 17/18; B60T 13/746; B60T 7/122; B60T 2210/20; B60T 2250/02
USPC .......................................................... 701/70
See application file for complete search history.

(56) References Cited

FOREIGN PATENT DOCUMENTS

| | | | | | |
|---|---|---|---|---|---|
| CN | 106394522 A | * | 2/2017 | ................ | B60T 7/12 |
| CN | 115891958 A | * | 4/2023 | .............. | B60T 17/22 |
| DE | 102007019537 A1 | | 10/2008 | | |
| DE | 10033835 B4 | | 5/2013 | | |
| DE | 102013218401 A1 | | 3/2015 | | |
| DE | 102015202337 A1 | | 8/2016 | | |
| FR | 2995858 A1 | * | 3/2014 | ........... | B60T 8/1766 |

* cited by examiner

*Primary Examiner* — Hai H Huynh
(74) *Attorney, Agent, or Firm* — Kristin L. Murphy

(57) ABSTRACT

A method for operating a braking system for a motor vehicle is proposed. The method includes the step of operating at least one rear wheel brake and at least one front wheel brake to perform a parking braking function when there is a requirement for parking braking. Furthermore, a braking system, a method for controlling it, a computer program, a control unit and a motor vehicle are proposed.

26 Claims, 5 Drawing Sheets

METHOD FOR OPERATING A BRAKING SYSTEM FOR A MOTOR VEHICLE, BRAKING SYSTEM AND METHOD FOR CONTROLLING IT, COMPUTER PROGRAM PRODUCT, CONTROL UNIT AND MOTOR VEHICLE

CROSS-REFERENCE TO RELATED APPLICATION

This application claims priority to German Priority Application No. 102022130192.3, filed Nov. 15, 2022, the disclosure of which is incorporated herein by reference in its entirety.

TECHNICAL FIELD

The present disclosure relates to a method for operating a braking system for a motor vehicle, such a braking system and a method for controlling it, a computer program, a control unit and a motor vehicle.

BACKGROUND

Braking systems for motor vehicles are increasingly electronically controlled systems with electromechanical brakes (EMB). The electromechanical brake is used, for example, as a parking brake (EPB) for holding the motor vehicle at a standstill, for example when the motor vehicle is on an inclined road.

During continuous further development, an improved concept for a parking brake is desired, for example to improve the stability of a motor vehicle in a parking braking state on a slope and/or to prevent a failure.

SUMMARY

An exemplary method for operating a braking system is disclosed herein, as is a braking system and an exemplary method for controlling. In addition, a computer program, a control unit and a motor vehicle are proposed herein. Advantageous embodiments and/or designs and/or aspects result from the dependent claims, the following description and the figures.

According to one aspect, an exemplary method for operating a braking system for a motor vehicle is proposed, which is also referred to below as an operating method. The proposed method contains a step of operating at least one rear wheel brake and at least one front wheel brake to perform a parking braking function, and in one exemplary arrangement, when there is a requirement for parking braking.

As a result, in addition to the at least one rear wheel brake, the at least one front wheel brake is also used to carry out parking braking of the motor vehicle. This approach favours improved stability of the motor vehicle in a parking brake state, for example on a slope, since not only the at least one rear wheel brake, but also the at least one front wheel brake is active. This approach also makes it possible for the at least one front wheel brake to perform a redundancy function for the at least one rear wheel brake and, conversely, for the at least one rear wheel brake to perform a redundancy function for the at least one front wheel brake, so that fail-safe parking braking is favoured.

In the present disclosure, the term "wheel brake" is to be understood as a braking device which is set up to cause braking and/or holding on a wheel of a motor vehicle, for example to act directly and/or immediately. For example, the wheel brake is or contains a drum brake or a disc brake. In the present disclosure, the term "rear wheel brake" is to be understood as a wheel brake which is assigned to a rear wheel or is designed to be assigned to a rear wheel. In the present disclosure, the term "front wheel brake" is to be understood as a wheel brake which is assigned to a front wheel or is designed to be assigned to a front wheel.

In the present disclosure, the term "parking braking function" is to be understood as a function by which a motor vehicle equipped with the braking system is kept at a standstill when parking braking has occurred. This is to prevent the motor vehicle from rolling away unintentionally, even if the motor vehicle is parked on an inclined road. The process of parking braking can also be referred to as holding braking. The term "parking braking function" is therefore also to be seen in the present disclosure as a synonym for the term "holding braking function". The parking braking function or holding braking function can also be used for emergency braking of the motor vehicle. The parking braking function or holding braking function therefore also implies an emergency braking function.

In one exemplary arrangement, the at least one rear wheel brake and the at least one front wheel brake are applied in such a way that a clamping force induced by the at least one rear wheel brake and a clamping force induced by the at least one front wheel brake are present to cause a desired holding braking force. As a result, the force requirement that is necessary to bring the motor vehicle into a parking braking state in different parking positions and, for example, to hold it permanently, can be flexibly adjusted. This force requirement is determined by the desired holding braking force and accordingly implemented by the clamping force on the respective assigned vehicle wheel caused by the respective wheel brake. The force requirement can also take into account the load condition of the motor vehicle. In this respect, the desired holding braking force may be higher for a loaded motor vehicle than for a motor vehicle without a load.

In the present disclosure, the term "clamping force" is to be understood as a force caused by a friction lining during parking braking, for example, a frictional force, such as when the friction lining presses against a brake disc or brake drum. In the present disclosure, the term "holding braking force" is to be understood as the force applied by the braking system during parking braking, such as to keep the motor vehicle at a standstill, for example to keep it permanently at a standstill.

In one exemplary arrangement, the at least one rear wheel brake and the at least one front wheel brake are operated in such a way that the clamping force caused by the at least one rear wheel brake and the clamping force caused by the at least one front wheel brake are present in a specified force distribution to cause the desired holding braking force. As a result, the force requirement for the respective wheel brake can be set or adjusted individually and/or flexibly in order to achieve the desired holding braking force overall.

For example, the at least one rear wheel brake and the at least one front wheel brake are operated in such a way that the clamping force caused by the at least one rear wheel brake and the clamping force caused by the at least one front wheel brake are different from each other when a stopping position of the motor vehicle on a slope is recognized or detected. The force distribution of the clamping force between the at least one rear wheel brake and at the least one front wheel brake may be different in such a way that the orientation of the motor vehicle on the slope is taken into account.

For example, the at least one rear wheel brake and the at least one front wheel brake are operated in such a way that the clamping force caused by the at least one rear wheel brake is greater than the clamping force caused by the at least one front wheel brake if a stopping position of the motor vehicle is detected or determined on a slope with an uphill forward direction of travel. For example, the at least one rear wheel brake and the at least one front wheel brake are operated in such a way that the clamping force caused by the at least one rear wheel brake is less than the clamping force caused by the at least one front wheel brake if a stopping position of the motor vehicle on a slope with a downhill forward direction of travel is recognized or detected.

In principle, the at least one rear wheel brake and the at least one front wheel brake can also be operated in such a way that the clamping force caused by the at least one rear wheel brake and the clamping force caused by the at least one front wheel brake are a maximum force, for example if a stopping position of the motor vehicle on a slope is recognized or detected. This operation is useful if the slope is relatively steep, for example if it is a steep slope.

In addition, the at least one rear wheel brake and the at least one front wheel brake may be operated in such a way that the clamping force caused by the at least one rear wheel brake and the clamping force caused by the at least one front wheel brake are a maximum force if a load of the motor vehicle above a specified weight value and a stopping position of the motor vehicle on a slope are detected. This operation also takes into account the influence of a payload or a load condition of the motor vehicle.

It may also be provided that, in the event of a detected failure of the parking braking function of at least one of the wheel brakes, the at least one remaining wheel brake will be operated in such a way that the clamping force of the at least one remaining wheel brake causes the desired holding braking force. This operation is aimed at redundant use of the at least one remaining wheel brake instead of the at least one failed wheel brake. This makes it possible that even if the at least one wheel brake fails, the desired holding braking force is achieved.

According to another aspect, a braking system for a motor vehicle is proposed. In one exemplary arrangement, the proposed braking system is suitable or designed to carry out the operating method described above. The proposed braking system contains at least one rear wheel brake, which has a parking braking function and is set up to be assigned to a rear wheel of the motor vehicle. The proposed braking system also contains at least one front wheel brake, which has a parking braking function and is set up to be assigned to a front wheel of the motor vehicle.

Further, the proposed braking system contains a control unit, for example, an electrical control unit. In one exemplary arrangement, the control unit is set up to control both the at least one rear wheel brake and the at least one front wheel brake in order to perform the respective parking braking functions thereof, for example if there is a parking braking requirement, for example if it is recognized or detected. The control unit has a connection for signal transfer to the at least one rear wheel brake and the at least one front wheel brake.

The term "control unit" in the present disclosure is to be understood as an electronic unit of computer hardware which controls certain operations and/or procedures in connection with the braking system. The control unit may have a digital processing unit, which contains a microprocessor unit (CPU), for example. The CPU may have a connection for data transfer and/or signal transfer to a memory system and/or a bus system. The control unit may have one or more programs or program modules. The digital processing unit may be designed in such a way that commands implemented as a program stored in a memory system are processed, input signals are received from a data bus system, or output signals are delivered to a data bus system. A memory system may have one or more memory media, in particular different memory media. The memory media may be optical and/or magnetic memory media and/or solid-state memory media and/or other, preferably non-volatile, memory media.

The control unit is set up to control the at east one rear wheel brake and the at least one front wheel brake in order to perform the respective parking braking functions thereof in such a way that there is a clamping force caused by the at least one rear wheel brake and a clamping force caused by the at least one front wheel brake to produce a desired holding braking force.

For example, the control unit is also set up to control the at least one rear wheel brake and the at least one front wheel brake in order to perform the respective parking braking functions thereof in such a way that the clamping force caused by the at least one rear wheel brake and the clamping force caused by the at least one front wheel brake are present in a specified force distribution in order to cause the desired holding braking force.

For example, the control unit is also set up to control the at least one rear wheel brake and the at least one front wheel brake in order to perform the respective parking braking functions thereof in such a way that an instantaneous load condition of the motor vehicle is taken into account in a force distribution between the clamping force of the at least one rear wheel brake and the clamping force of the at least one front wheel brake and/or in the magnitude of the clamping forces.

In one exemplary arrangement, the control unit is also set up to control the at least one rear wheel brake and the at least one front wheel brake in order to perform the respective parking braking functions thereof in such a way that the clamping force caused by the at least one rear wheel brake and the clamping force caused by the at least one front wheel brake are different from each other when a stopping position of the motor vehicle on a slope is detected.

For example, the control unit is set up to control the at least one rear wheel brake and the at least one front wheel brake in order to perform the respective parking braking functions thereof in such a way that the clamping force caused by the at least one rear wheel brake is greater than the clamping force caused by the at least one front wheel brake when a stopping position of the motor vehicle on a slope with an uphill forward direction of travel is detected.

For example, the control unit is set up to control the at least one rear wheel brake and the at least one front wheel brake in order to perform the respective parking braking functions thereof in such a way that the clamping force caused by the at least one front wheel brake is greater than the clamping force caused by the at least one rear wheel brake if a stopping position of the motor vehicle on a slope with a downhill forward direction of travel is detected.

For example, the control unit is also set up to control the at least one rear wheel brake and the at least one front wheel brake in order to perform the respective parking braking functions thereof in such a way that the clamping force caused by the at least one rear wheel brake and the clamping force caused by the at least one front wheel brake are a maximum force if a load of the motor vehicle above a specified weight value and a stopping position of the motor vehicle on a slope are detected.

The control unit is set up, in the event of a detected failure of the parking braking function of at least one of the wheel brakes, to control the at least one remaining wheel brake in such a way that the desired holding braking force is caused by the clamping force of the at least one remaining wheel brake.

The proposed braking system makes it possible to carry out the operating method described above. Accordingly, the advantages described for the operating method can be achieved with it.

In one exemplary arrangement, the proposed braking system contains two rear wheel brakes with a parking braking function, of which one rear wheel brake can be assigned to a left rear wheel and the other rear wheel brake to a right rear wheel of the motor vehicle. The proposed braking system also contains two front wheel brakes with a parking braking function, of which one front wheel brake can be assigned to a right front wheel and the other front wheel brake to a left front wheel of the motor vehicle. In this exemplary arrangement, the control unit may be set up to control the two rear wheel brakes and the two front wheel brakes to perform the respective parking braking functions thereof in such a way that the desired holding braking force is caused by the clamping force caused by the respective wheel brake.

For example, the control unit has a connection for signal transfer to one of the rear wheel brakes and one of the front wheel brakes via a first signal transfer connection. For example, one of the rear wheel brakes has a connection for signal transfer to the other front wheel brake via a second signal transfer connection. For example, one of the front wheel brakes has a connection for signal transfer to the other rear wheel brake via a third signal transfer connection. In this case, the control unit may be set up to control one rear wheel brake and one front wheel brake via the first signal transfer connection, the other front wheel brake via the second signal transfer connection and the other rear wheel brake via the third signal transfer connection in order to perform the respective parking braking functions thereof in such a way that the clamping force caused by the respective wheel brake causes the desired parking braking force.

The control unit may also be set up to control the remaining wheel brakes in such a way that, in the event of a failure of the second signal transfer connection and a consequent failure of the parking braking function of the assigned front wheel brake and/or in the event of a failure of the third signal transfer connection and a resulting failure of the parking braking function of the assigned rear wheel brake, the remaining wheel brakes are controlled in such a way that the desired holding braking force is caused by the clamping force of the remaining wheel brakes.

In another exemplary arrangement, the proposed braking system contains a further control unit. For example, the further control unit has a connection for signal transfer to the other rear wheel brake and the other front wheel brake via a fourth signal transfer connection. In this exemplary arrangement, the further control unit may be set up to control the two rear wheel brakes and the two front wheel brakes to perform the respective parking braking functions thereof instead of the control unit in the event of a failure of the control unit.

In another exemplary arrangement, the proposed braking system contains a parking brake switch. For example, the parking brake switch has a connection for signal transfer to the control unit via a switching connection and to the further control unit via another switching connection, for example for transmitting a parking braking requirement. In this exemplary arrangement, the further control unit may be set up in the event of a detected failure of the switching connection to the control unit to control the two rear wheel brakes and the two front wheel brakes to perform the respective parking braking functions thereof instead of the control unit.

The proposed braking system may be an electromechanical braking system. For example, in this case, the at least one rear wheel brake and the at least one front wheel brake are in the form of electromechanical wheel brakes. For example, the electromechanical wheel brake contains an electric motor for operating the wheel brake. For example, the electric motor can be controlled electrically, in one exemplary arrangement, by the control unit and/or the further control unit. For example, the electric motor is set up to mechanically build up a clamping force.

According to a further aspect, a method for controlling a braking system, for example, the braking system described above, is proposed, which is also referred to below as the control method. The braking system can be controlled by the proposed control method in such a way that the operating method described above is carried out. Accordingly, the advantages described for the operating method can be achieved with it.

The proposed operating method includes the step whereby both the at least one rear wheel brake and the at least one front wheel brake are controlled by the control unit to perform the respective parking braking functions thereof when there is a requirement for parking braking.

In one exemplary arrangement, the at least one rear wheel brake and the at least one front wheel brake are controlled by the control unit to perform the respective parking braking functions thereof in such a way that a clamping force caused by the at least one rear wheel brake and a clamping force caused by the at least one front wheel brake are present to cause a desired holding braking force.

For example, the at least one rear wheel brake and the at least one front wheel brake are controlled by the control unit in order to perform the respective parking braking functions thereof in such a way that the clamping force caused by the at least one rear wheel brake and the clamping force caused by the at least one front wheel brake are present in a predetermined force distribution in order to cause the desired holding braking force.

For example, the at least one rear wheel brake and the at least one front wheel brake are controlled by the control unit in order to perform the respective parking braking functions thereof in such a way that an instantaneous load condition of the motor vehicle is taken into account in a force distribution between the clamping force of the at least one rear wheel brake and the clamping force of the at least one front wheel brake and/or in the magnitude of the clamping forces.

The at least one rear wheel brake and the at least one front wheel brake are controlled by the control unit in order to perform the respective parking braking functions thereof in such a way that the clamping force caused by the at least one rear wheel brake and the clamping force caused by the at least one front wheel brake are different from each other when a stopping position of the motor vehicle on a slope is detected.

For example, the at least one rear wheel brake and the at least one front wheel brake are controlled by the control unit in order to perform the respective parking braking functions thereof in such a way that the clamping force caused by the at least one rear wheel brake is greater than the clamping force caused by the at least one front wheel brake if a stopping position of the motor vehicle on a slope with an uphill forward direction of travel is detected.

For example, the at least one rear wheel brake and the at least one front wheel brake are controlled by the control unit in order to perform the respective parking braking functions thereof in such a way that the clamping force caused by the at least one front wheel brake is greater than the clamping force caused by the at least one rear wheel brake if a stopping position of the motor vehicle on a slope with a downhill forward direction of travel is detected.

For example, the at least one rear wheel brake and the at least one front wheel brake are controlled by the control unit in order to perform the respective parking braking functions thereof in such a way that the clamping force caused by the at least one rear wheel brake and the clamping force caused by the at least one front wheel brake are a maximum force if a load of the motor vehicle above a specified weight value and a stopping position of the motor vehicle on a slope are detected.

In the event of a detected failure of the parking braking function of at least one of the wheel brakes the at least one remaining wheel brake will be controlled by the control unit in such a way that the desired holding force is caused by the clamping force of the at least one remaining wheel brake.

According to a further aspect, a computer program is proposed with a program code stored on a computer-readable medium for carrying out the method described above for controlling the proposed braking system.

According to a further aspect, a control unit is proposed, for the braking system described above, containing the computer program described above.

According to a further aspect, a motor vehicle with the braking system described above and/or the computer program described above and/or control unit described above is proposed, wherein the motor vehicle is designed to carry out the operating method described above.

BRIEF DESCRIPTION OF DRAWINGS

Further details and features can be found in the following description of several exemplary arrangements based on the drawings. In the figures.

DETAILED DESCRIPTION

Figure 1:
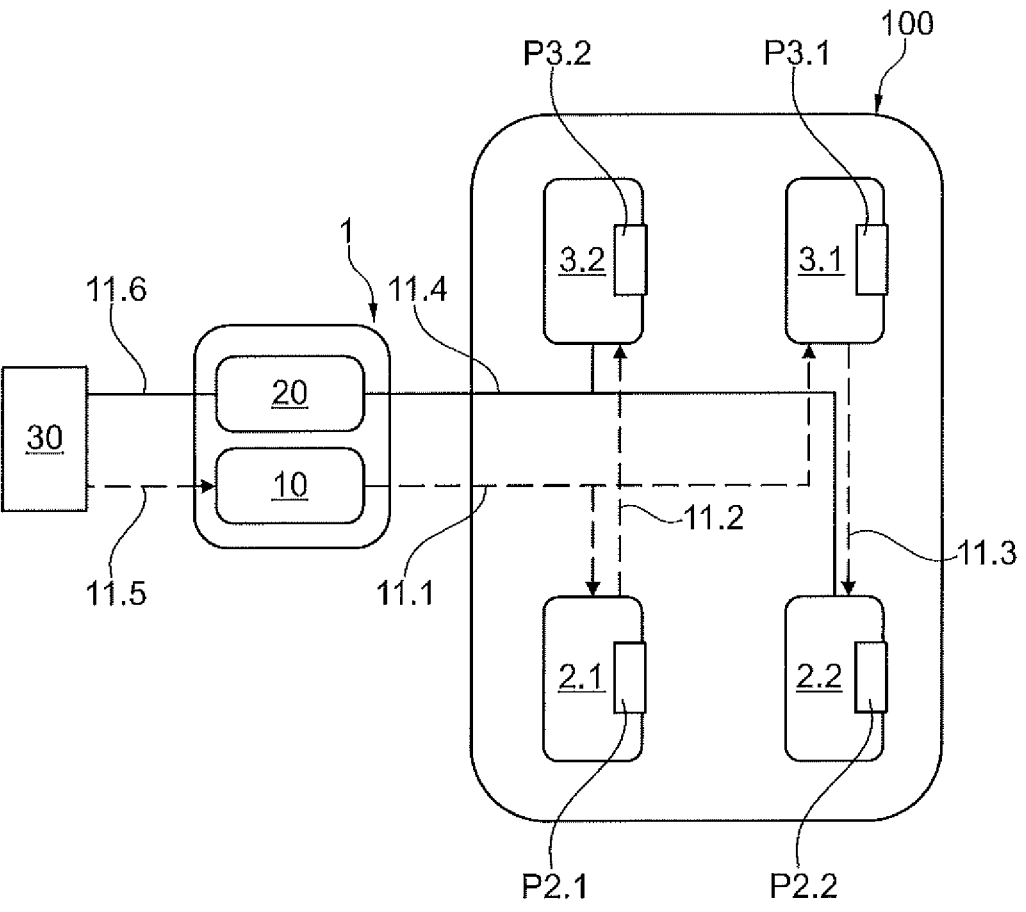
FIG. 1 shows an exemplary arrangement of a braking system for a motor vehicle in a schematized representation.

FIG. 1 shows an exemplary arrangement of a braking system 1 which is suitable for use in a motor vehicle 100.

FIG. 1 shows the vehicle 100 as an example, which is equipped with the exemplary braking system 1. The motor vehicle 100 can be an electric vehicle. For example, the motor vehicle 100 is a passenger car or a truck.

The exemplary braking system 1 contains two rear wheel brakes 2.1, 2.2, of which one rear wheel brake 2.1 is assigned to a left rear wheel (not shown in FIG. 1) and the other rear wheel brake 2.2 to a right rear wheel (not shown in FIG. 1) of the motor vehicle 100. The exemplary braking system 1 also contains two front wheel brakes 3.1, 3.2, one of which is assigned to a right front wheel (not shown in FIG. 1) and the other front wheelbrake 3.2 to a left front wheel (not shown in FIG. 1) of the motor vehicle 100, The two rear wheel brakes 2.1, 2.2 can be a disc brake or a drum brake. Also, the two front wheel brakes 3.1, 3.2 can be a disc brake or a drum brake.

In the exemplary braking system 1, the rear wheel brakes 2.1, 2.2 and the front wheel brakes 3.1, 3.2 each have a parking braking function P2.1, P2.2, P3.1, P3.2. As a result, the rear wheel brakes 2.1, 2.2 and the front wheel brakes 3.1, 3.2 can be used to perform parking braking of the motor vehicle 100. In the case of parking braking, a holding braking force is caused, which is intended to hold the motor vehicle 100 at a standstill, for example when the motor vehicle 100 is parked on a slope.

The rear wheel brakes 2.1, 2.2 and the front wheel brakes 3.1, 3.2 may be those braking devices which are used as the service brake of the motor vehicle 100. In this case, the parking braking function P2.1 or P2.2 or P3.1 or P3.2 can be an additional function, which is carried out by the actuator that is active during a service braking process. This actuator is then active, for example, when the motor vehicle 100 is at a standstill. Alternatively, a separate parking brake actuator may also be provided to perform the parking braking function P2.1 or P2.2 or P3.1 or P3.2.

The exemplary braking system 1 contains a control unit 10 which is set up to control at least one of the two rear wheel brakes 2.1, 2.2 and at least one of the two front wheel brakes 3.1, 3.2 to perform the parking braking functions P2.1 or P2.2 or P3.1 or P3.2 thereof, for example to control them in such a way that a desired holding braking force is achieved by the clamping force caused by the controlled wheel brakes 2.1, 2.2, 3.1, 3.2. For example, the desired holding braking force is a braking force by which the motor vehicle 100 is held at a standstill, in one exemplary arrangement, permanently.

Since, in addition to the at least one rear wheel brake 2.1, the at least one front wheel brake 3.1 is also used to carry out parking braking of the motor vehicle 100, improved stability of the motor vehicle 100 in the parking braking state is favoured, especially when the motor vehicle 100 is parked on a slope. This also means that the at least one front wheel brake 3.1 can perform a redundancy function for the at least one rear wheel brake 2.1, i.e. can take over the function of the other wheel brake in the event of a failure.

The exemplary braking system 1 may be an electromechanical braking system (EMB) in which the rear wheel brakes 2.1, 2.2 and the front wheel brakes 3.1, 3.2 are in the form of electromechanical wheel brakes, for example they have an electric motor as an actuator. For example, an electrical parking brake (EPB) is assigned to the electromechanical braking system by the parking braking function P2.1 or P2.2 or P3.1 or P3.2 or is an integral part thereof.

The control unit 10 is in the form of an electrical control unit. For example, the control unit 10 has a connection for signal transfer via a first signal transfer connection 11.1 to one of the rear wheel brakes 2.1, 2.2, to the rear wheel brake 2.1, and to one of the front wheel brakes 3.1, 3.2, the front wheel brake 3.1, is directly and/or immediately connected for signal transfer. For example, one rear wheel brake 2.1 has a connection for signal transfer to the other front wheel brake 3.2 via a second signal transfer connection 11.2, is directly and/or immediately connected for signal transfer. For example, one front wheel brake 3.1 has a connection for signal transfer to the other rear wheel brake 2.2 via a third signal transfer connection 11.3, is directly and/or immediately connected for signal transfer. For example, the first signal transfer connection 11.1 and/or the second signal transfer connection 11.2 and/or the third signal transfer connection 11.3 is a signal transfer connection of a bus system.

For example, the exemplary braking system 1 contains a further control unit 20, i.e., a further electrical control unit 20. The further control unit 20 is used, for example, to control the rear wheel brakes 2.1, 2.2 and the front wheel brakes 3.1, 3.2 during service braking. For example, the further control unit 20 has a connection for signal transfer to the other rear wheel brake 2.2 and the other front wheel brake 3.2 via a fourth signal transfer connection 11.4, is directly and/or immediately connected for signal transfer. For example, the fourth signal transfer connection 11.4 is a signal transfer connection of the bus system described above or a separate bus system.

Furthermore, the exemplary braking system 1 may contain a parking brake switch 30. For example, the parking brake switch 30 can be operated electrically. For example, by operating the parking brake switch 30, an electrical signal is output with information about a parking braking requirement. For example, the parking brake switch 30 has a connection for signal transfer to the control unit 10 via a switching connection 11.5, is directly and/or immediately connected for signal transfer. By operating the parking brake switch 30, the control unit 10 is presented with the signal with the parking braking requirement, by which a parking braking process is then initiated by the control unit 10 by activating at least one of the rear wheel brakes 2.1, 2.1 and at least one of the front wheel brakes 3.1, 3.2. The parking brake switch 30 may be operated by the driver of the motor vehicle 100 or automatically, for example on the basis of an implemented hill-holding function and/or hill-start function of an assistance system of the motor vehicle 100.

The exemplary braking system 1 may have alternatively or additionally implemented several or many operating functions with regard to the parking braking functionality thereof, of which individual operating functions are described below as examples. FIG. 1 shows an example of a possible signal path using the dashed arrows shown.

For example, the control unit 10 is set up to control at least one of the rear wheel brakes 2.1, 2.2 and at least one of the front wheel brakes 3.1, 3.2 in order to perform the respective parking braking functions thereof P2.1 or P2.2 or P3.1 or P3.2 in such a way that the clamping force caused by the at least one rear wheel brake 2.1 and the clamping force caused by the at least one front wheel brake 3.1 are present in a given force distribution in order to achieve the desired holding braking force. The desired holding braking force is therefore the sum of the clamping force or holding force caused at the wheel brakes 2.1, 3.1.

If only one of the rear wheel brakes 2.1, 2.2 and only one of the front wheel brakes 3.1, 3.2 are activated by the control unit 10 for parking braking, half the desired holding braking force may be distributed to each of the controlled wheel brakes 2.1, 3.1. If the two rear wheel brakes 2.1, 2.2 and also the two front wheel brakes 3.1, 3.2 are controlled by the control unit 10 for parking braking, a quarter of the desired holding braking force may be distributed to the respective wheel brakes 2.1 or 2.2 or 3.1 or 3.2. As a result, the respective wheel brakes 2.1 or 2.2 or 3.1 or 3.2 can generally be dimensioned smaller compared to a design in which only the rear wheel brakes are equipped with a parking braking function.

Figure 2:
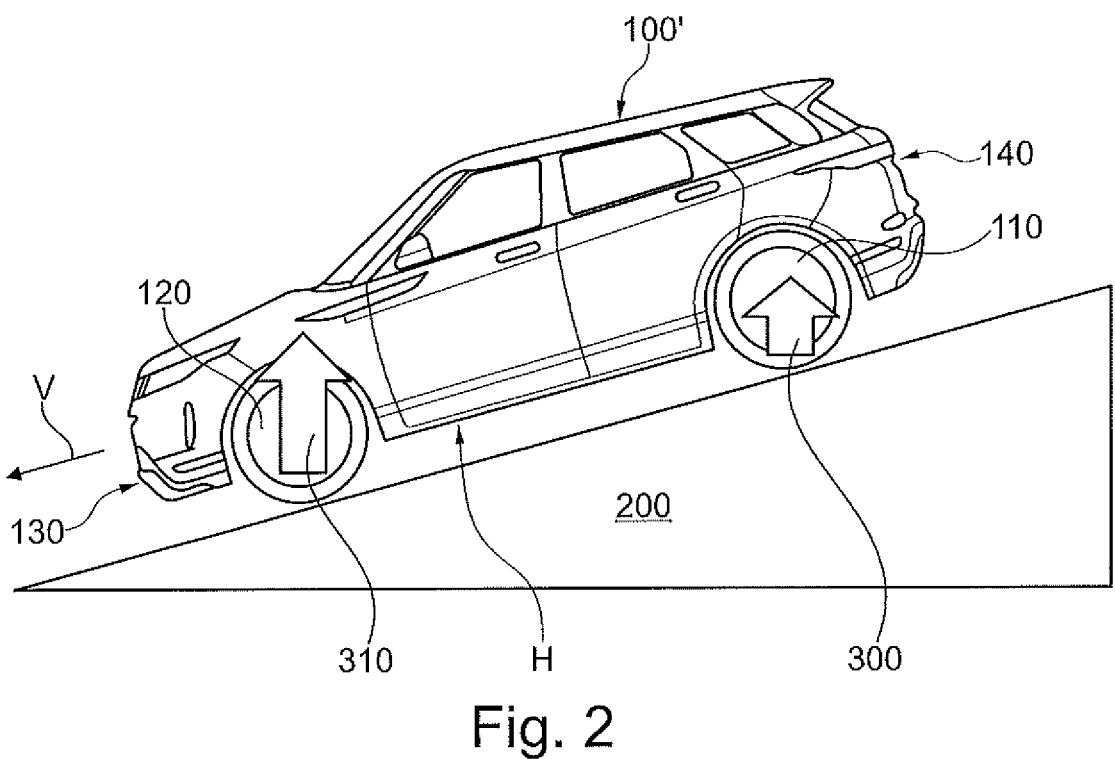
FIG. 2 shows a motor vehicle with the exemplary braking system of FIG. 1 in a stopping position on a slope with a downhill forward direction of travel, shown in a side view.

This also results in advantages in the event that the motor vehicle 100 is parked on a slope and is to be kept there at a standstill by the exemplary braking system 1, for example, permanently at a standstill. FIG. 2 shows an example of a motor vehicle 100' that is in a holding position H on a slope 200, i.e. is parked on a slope, and is standing with its forward direction V downhill. The forward direction V is to be understood as the fact that the motor vehicle 100' is oriented with its front downhill 130 relative to its rear 140. As an example, the side view of FIG. 2 shows a rear wheel 110 and a front wheel 120 of the motor vehicle 100'. For example, the motor vehicle 100' shown there is equipped with the exemplary braking system 1 of FIG. 1.

As indicated by arrows 300 and 310 in FIG. 2, at least one of the rear wheel brakes 2.1, 2.2 and at least one of the front wheel brakes 3.1, 3.2 may be applied in such a way that the clamping force of the at least one rear wheel brake 2.1 and the clamping force of the at least one front wheel brake 3.1 are different from each other if the holding position H described above is detected or determined. Arrows 300 and 310 in FIG. 2 are intended to indicate the clamping force (arrow 300) caused by the at least one rear wheel brake 2.1 on the one hand and the clamping force (arrow 310) caused by the at least one front wheel brake 3.1 on the other.

In order to achieve such a distribution of the clamping force, the control unit 10 is set up, for example, to control the at least one rear wheel brake 2.1 and the at least one front wheel brake 3.1 to perform the respective parking braking functions P2.1 and P3.1 thereof respectively in such a way that the clamping force caused by the at least one rear wheel brake 2.1 and the clamping force caused by the at least one front wheel brake 3.1 are different from each other when the motor vehicle 100' is in a stationary position on a slope, such as the slope 200.

For example, the control unit 10 is also set up to control the at least one rear wheel brake 2.1 and the at least one front wheel brake 3.1 in order to perform the respective parking braking functions P2.1 and P3.1 thereof in such a way that the clamping force (arrow 310) caused by the at least one front wheel brake 3.1 is greater than the clamping force (arrow 300) caused by the at least one rear wheel brake 2.1 if a holding position on a slope, such as the holding position H on the slope 200 with the downhill forward direction V according to FIG. 2, is detected or determined.

Figure 3:
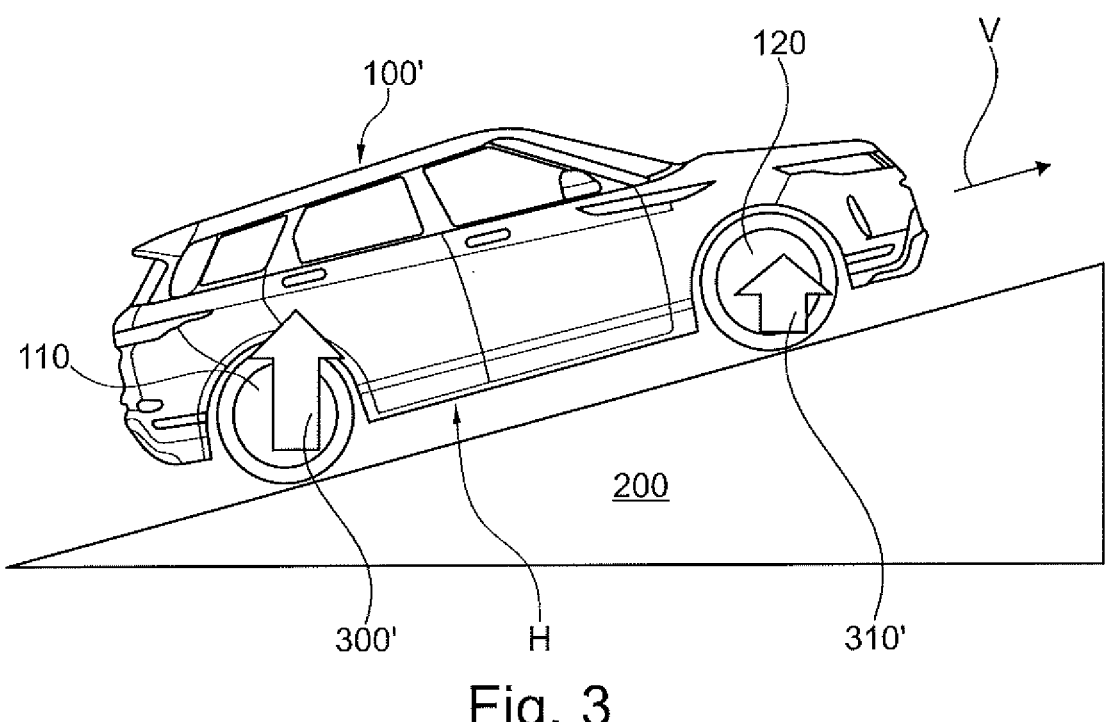
FIG. 3 shows a motor vehicle with the exemplary braking system of FIG. 1 in a stopping position on a slope with an uphill forward direction of travel, shown in a side view.

In addition or alternatively, the control unit 10 may be set up to control at least one rear wheel brake 2.1 and the at least one front wheel brake 3.1 to perform the respective parking braking functions P2.1 and P3.1 thereof in such a way that the clamping force (arrow 300') caused by the at least one rear wheel brake 2.1 is greater than the clamping force (arrow 310') caused by the at least one front wheel brake 3.1 if a holding position on a slope, such as the holding position H on the slope 200 with an uphill forward direction V according to FIG. 3, is detected or determined. The above also applies in the event that the two rear wheel brakes 2.1, 2.2 and the two front wheel brakes 3.1, 3.2 are controlled to perform the respective parking braking functions P2.1 or P2.2 or P3.1 or P3.2 thereof.

Due to the exemplary braking system it is therefore possible to adjust a distribution of the clamping force caused by the wheel brakes 2.1, 2.2, 3.1, 3.2 according to the parking position of the motor vehicle 100 or 100'. The gradient of the slope 200 can also be taken into account here. In addition, the load condition of the motor vehicle 100 or 100' can be taken into account. For example, the control unit 10 is set up to control the at least one rear wheel brake 2.1 and the at least one front wheel brake 3.1 to perform the respective parking braking functions P2.1 and P3.1 thereof in such a way that an instantaneous load condition of the motor vehicle 100 or 100' is taken into account in a force distribution between the clamping force of the at least one rear wheel brake 2.1 and in the clamping force of the at least one front wheel brake 3.1 and/or in the magnitude of the clamping forces.

If the motor vehicle 100 or 100' is parked on a steep slope and/or has a large payload, the braking system 1 may be adjusted to a maximum condition. For example, for this purpose the control unit 10 is set up to control the two rear wheel brakes 2.1, 2.2 and the two front wheel brakes 3.1, 3.2 in order to perform the respective parking braking functions P2.1 or P2.2 or P3.1 or P3.2 thereof in such a way that the clamping forces caused by the two rear wheel brakes 2.1, 2.2 and the clamping forces caused by the two front wheel brakes 3.1, 3.2 are a maximum force if a load of the motor vehicle 100 or 100' above a specified weight value and a holding position of the motor vehicle 100 or 100' on a slope, in particular a steep slope, are detected or determined. For example, in this case the wheel brakes 2.1, 2.2, 3.1, 3.2 preferably each exert a maximum clamping force.

Figure 4:
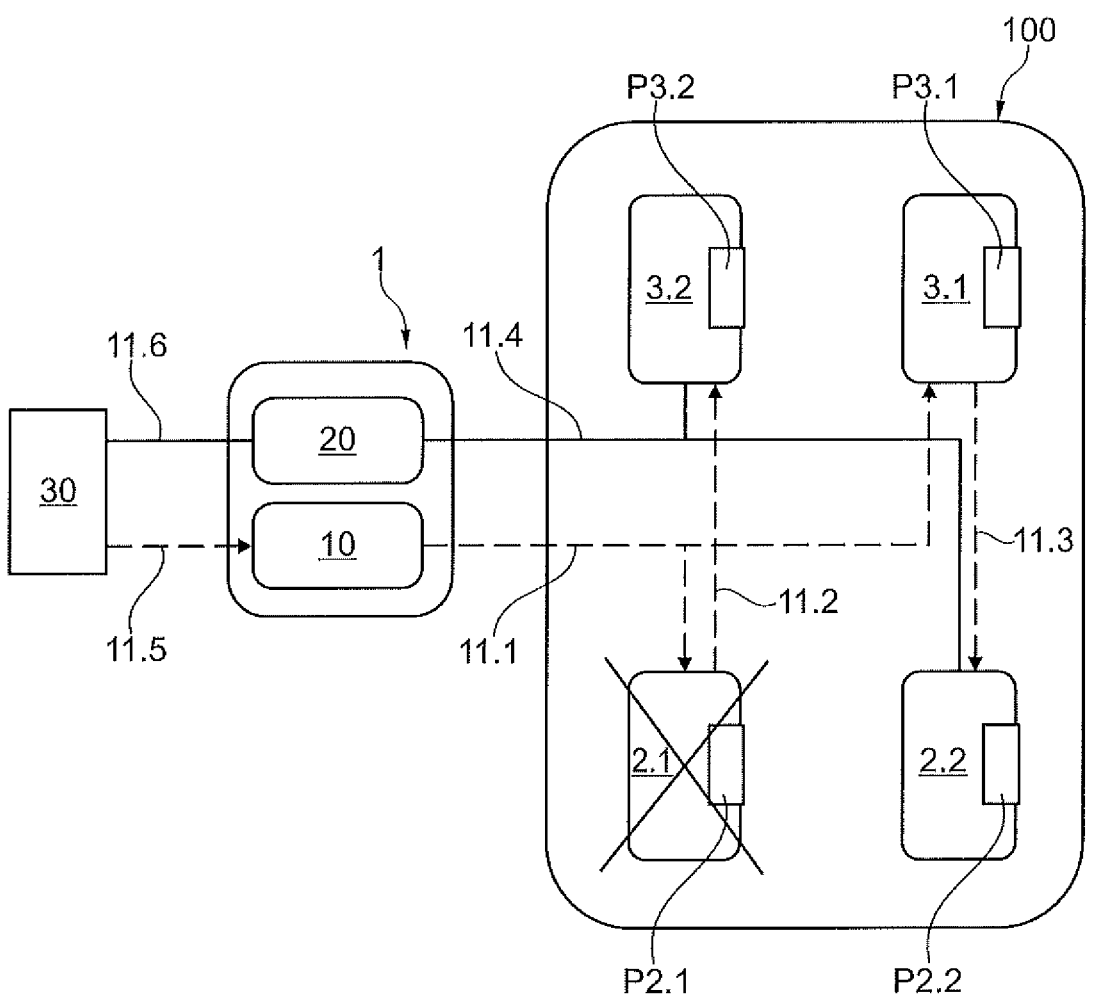
FIG. 4 shows the exemplary braking system of FIG. 1 in an operating mode in which a functional element of the braking system has failed.

The exemplary braking system 1 also offers the possibility of compensating for the failure of one or more functional components. For example, the control unit 10 of the exemplary braking system 1 is set up to control the at least one remaining wheel brake 2.1 or 2.2 or 3.1 or 3.2 in the event of a detected failure of the parking braking function P2.1 or P2.2 or P3.1 of P3.2 in such a way that the desired parking braking force is caused by the clamping force thereof. This is shown in FIG. 4 by way of example, where the failure of the wheel brake 2.1 is indicated by the crossed-out symbolism.

Figure 5:
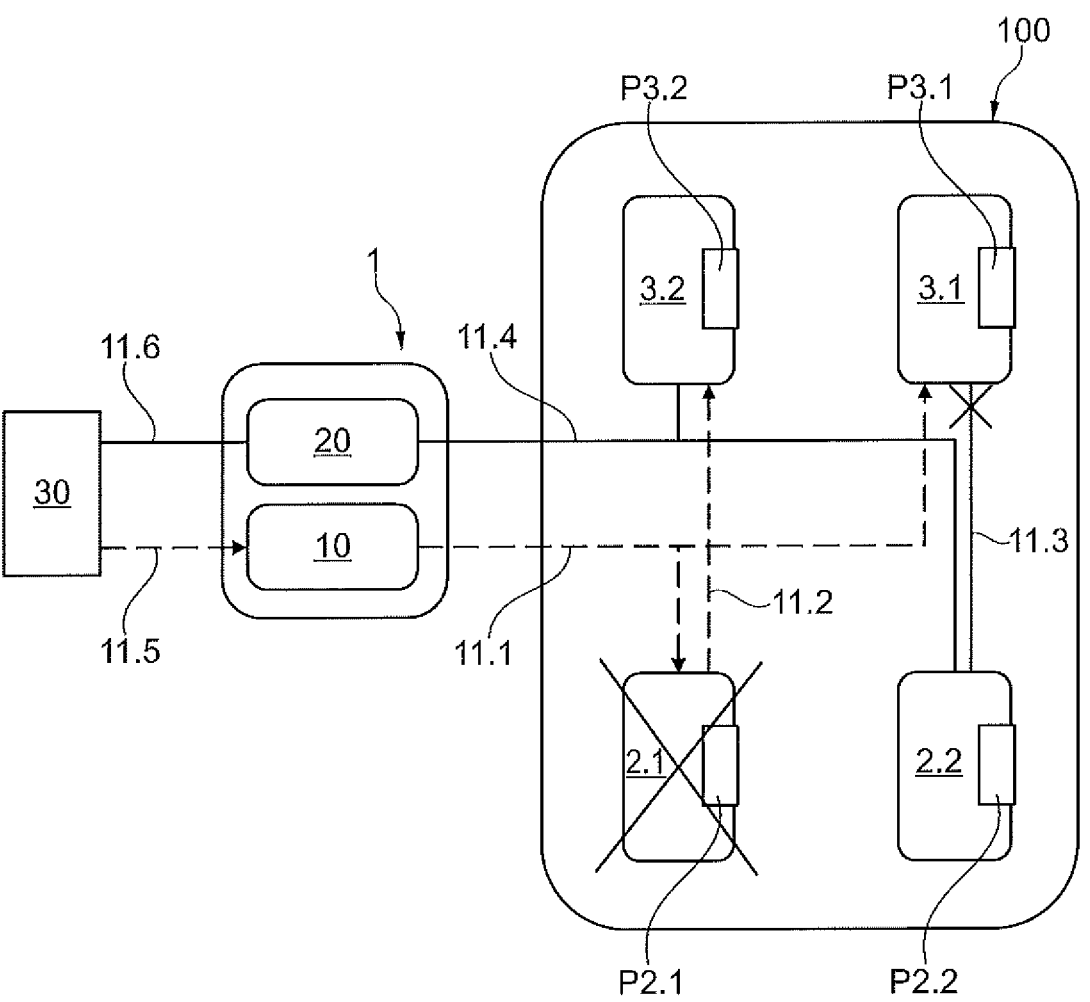
FIG. 5 shows the exemplary braking system of FIG. 1 in an operating mode in which another functional element of the braking system has failed.

FIG. 5 shows another failure scenario, which is indicated by the crossed-out symbolism on the third signal transfer connection 11.3 and is intended to illustrate a failure or malfunction of the third signal transfer connection 11.3. In this case, for example, the control unit 10 of the exemplary braking system 1 is set up to control the remaining wheel brakes 2.1, 3.1, 3.2 in such a way that the desired holding braking force is caused by the clamping force thereof in the event of a determined or detected failure of the third signal transfer connection 11.3 and a consequent failure of the parking braking function P2.2 of the associated rear wheel brake 2.2.

Figure 6:
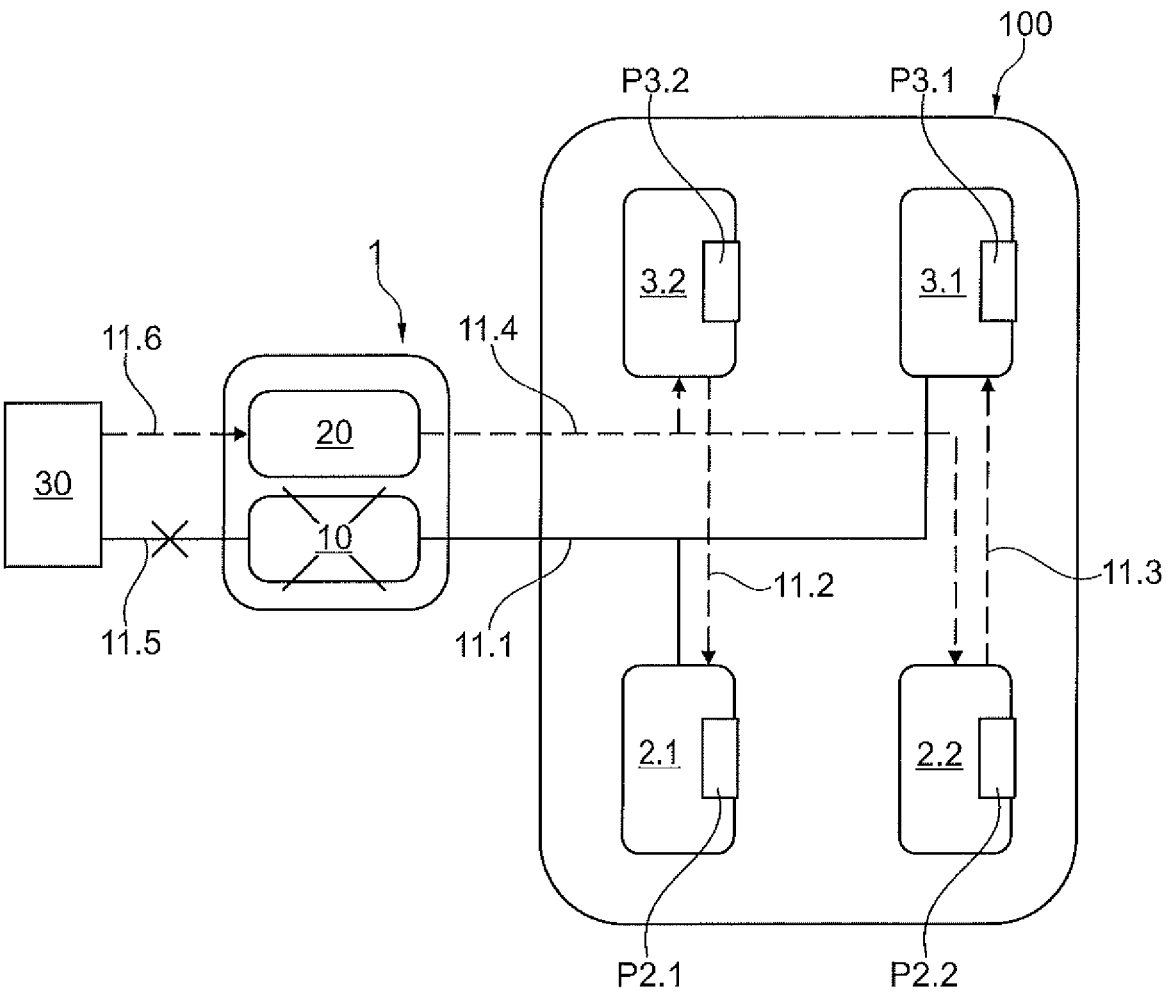
FIG. 6 shows the exemplary braking system of FIG. 1 in an operating mode in which yet another functional element of the braking system has failed.

FIG. 6 shows yet another failure scenario, which is indicated there by the crossed-out symbols on the control unit 10 and the switching connection 11.5 and is intended to illustrate a failure of the switching connection 11.5 and/or the control unit 10. With regard to a failure of the control unit 10, the further control unit 20 is used as an alternative. In this case, for example, in the event of a detected failure of the control unit 10, instead of this the further control unit 20 is set up to control the two rear wheel brakes 2.1, 2.2 and the two front wheel brakes 3.1, 3.2 to perform the respective parking braking functions P2.1 or P2.2 or P3.3 or P3.2 thereof. FIG. 6 shows an example of a possible signal path based on the dashed arrows shown:

Information about a failure of the control unit 10 can be obtained by the further control unit 20 via a further switching connection 11.6, by which the further control unit 20 can be connected for signal transfer to the parking brake switch 30. For example, in the event of a failure or malfunction of the switching connection 11.5, the further control unit 20 is set up to control the two rear wheel brakes 2.1, 2.2 and the two front wheel brakes 3.1, 3.2 instead of the control unit 10 to perform the respective parking braking functions P2.1 or P2.2 or P3.1 or P3.2 thereof. In this case, the further control unit 20 also takes over the function of the control unit 10 with regard to the upcoming parking braking process.

The invention claimed is:

1. A method for operating a braking system for a motor vehicle, comprising: operating at least one rear wheel brake and at least one front wheel brake to perform a parking braking function when there is a requirement for parking braking > wherein the at least one rear wheel brake and the at least one front wheel brake are operated in such a way that a clamping force caused by the at least one rear wheel brake and a clamping force caused by the at least one front wheel brake are present to cause a desired holding braking force.

2. The method according to claim 1, wherein the at least one rear wheel brake and the at least one front wheel brake are operated in such a way that the clamping force caused by the at least one rear wheel brake and the clamping force caused by the at least one front wheel brake are present in a given force distribution to cause the desired parking braking force.

3. The method according to claim 1, wherein the at least one rear wheel brake and the at least one front wheel brake are operated in such a way that the clamping force caused by the at least one rear wheel brake and the clamping force caused by the at least one front wheel brake are different from each other when a holding position of the motor vehicle on a slope is detected.

4. The method according to claim 1, wherein the at least one rear wheel brake and the at least one front wheel brake are operated in such a way that the clamping force caused by the at least one rear wheel brake is greater than the clamping force caused by the at least one front wheel brake when a holding position of the motor vehicle on a slope with an uphill forward direction of travel is detected.

5. The method according to claim 1, wherein the at least one rear wheel brake and the at least one front wheel brake are operated in such a way that the clamping force caused by the at least one rear wheel brake and the clamping force caused by the at least one front wheel brake are a maximum force when a load of the motor vehicle above a specified weight value and a holding position of the motor vehicle on a slope are detected.

6. The method according to any one of claim 1, wherein in the event of a detected failure of the parking braking function of at least one of the wheel brakes the at least one remaining wheel brake is operated in such a way that the desired holding braking force is caused by the clamping force of the at least one remaining wheel brake.

7. The braking system for a motor vehicle, for carrying out a method according to claim 1, comprising:

> at least one rear wheel brake which has a parking braking function and is set up to be assigned to a rear wheel of the motor vehicle,
>
> at least one front wheel brake which has a parking braking function and is set up to be assigned to a front wheel of the motor vehicle, and a control unit which is set up to control both the at least one rear wheel brake and the at least one front wheel brake to perform the respective parking braking functions thereof.

8. The braking system according to claim 7, wherein the control unit is configured to control the at least one rear wheel brake and the at least one front wheel brake to perform the respective parking braking functions thereof in such a way that a clamping force caused by the at least one rear wheel brake and a clamping force caused by the at least one front wheel brake are present to cause the desired holding braking force.

9. The braking system according to claim 8, wherein the control unit is configured to control the at least one rear wheel brake and the at least one front wheel brake to perform the respective parking braking functions thereof in such a way that the clamping force caused by the at least one rear wheel brake and the clamping force caused by the at least one front wheel brake are present in a given force distribution to cause the desired parking braking force.

10. The braking system according to claim 8, wherein the control unit is configured to control the at least one rear wheel brake and the at least one front wheel brake to perform the respective parking braking functions thereof in such that an instantaneous load condition of the motor vehicle is taken into account in a force distribution between the clamping force of the at least one rear wheel brake and the clamping force of the at least one front wheel brake and/or in the magnitude of the clamping forces.

11. The braking system according to claim 8, wherein the control unit is configured to control the at least one rear wheel brake and the at least one front wheel brake to perform the respective parking braking functions thereof such that the clamping force caused by the at least one rear wheel brake and the clamping force caused by the at least one front wheel brake are different from each other if a holding position of the motor vehicle on a slope is detected.

12. The braking system according to claim 8, wherein the control unit is configured to control the at least one rear wheel brake and the at least one front wheel brake to perform the respective parking braking functions thereof in such a way that the clamping force caused by the at least one rear wheel brake is greater than the clamping force caused by the at least one front wheel brake if a holding position of the motor vehicle on a slope with an uphill forward direction is detected.

13. The braking system according to claim 8, wherein the control unit is configured to control the at least one rear wheel brake and the at least one front wheel brake to perform the respective parking braking functions thereof in such a way that the clamping force caused by the at least one rear wheel brake and the clamping force caused by the at least one front wheel brake are a maximum force if a load of the motor vehicle above a specified weight value and a holding position of the motor vehicle on a slope are detected.

14. The braking system according to claim 8, wherein the control unit is configured to control the at least one remaining wheel brake in the event of a failure of the parking braking function of at least one of the wheel brakes in such a way that the desired parking braking force is caused by the clamping force of the at least one remaining wheel brake.

15. The braking system according to claim 7, comprising:
two rear wheel brakes with a parking braking function, one of which can be assigned to a left rear wheel and the other rear wheel brake to a right rear wheel of the motor vehicle, and two front wheel brakes with a parking braking function, one of which can be assigned to a right front wheel and the other front brake to a left front wheel of the motor vehicle.

16. The braking system according to claim 15, wherein the control unit is configured to control the two rear wheel brakes and the two front wheel brakes to perform the respective parking braking functions thereof in such a way that the desired parking braking force is caused by the clamping force caused by the respective wheel brake.

17. The braking system according to claim 15, wherein the control unit has a connection for signal transfer via a first signal transfer connection to one of the rear wheel brakes and one of the front wheel brakes, the one rear wheel brake has a connection for signal transfer to the other front wheel brake via a second signal transfer connection and the one front wheel brake has a connection for signal transfer to the other rear wheel brake via a third signal transfer connection.

18. The braking system according to claim 17, wherein the control unit is configured to control one rear wheel brake and one front wheel brake via the first signal transfer connection, the other front wheel brake via the second signal transfer connection and the other rear wheel brake via the third signal transfer connection to perform the respective parking braking functions thereof in such a way that the clamping force caused by the respective wheel brake causes the desired parking braking force.

19. The braking system according to claim 18, wherein the control unit is configured to control the remaining wheel brakes in such a way that, in the event of a detected failure of the second signal transfer connection and a consequent failure of the parking braking function of the assigned front wheel brake and/or in the event of a detected failure of the third signal transfer connection and a consequent failure of the parking braking function of the assigned rear wheel brake, the clamping force of the remaining wheel brakes causes the desired parking braking force.

20. The braking system according to claim 17, containing a further control unit, which has a connection for signal transfer to the other rear wheel brake and the other front wheel brake via a fourth signal transfer connection and is configured, in the event of a detected failure of the control unit, to control the two rear wheel brakes and the two front wheel brakes to perform the respective parking braking functions thereof instead of the control unit.

21. The braking system according to claim 20, containing a parking brake switch with a connection for signal transfer via a switching connection to the control unit and via a further switching connection to the further control unit for transmitting a parking braking requirement, wherein the further control unit is set up, in the event of a failure of the switching connection to the control unit, to control the two rear wheel brakes and the two front wheel brakes to perform the respective parking braking functions thereof instead of the control unit.

22. The braking system according to claim 7 in the form of an electromechanical braking system, wherein the at least one rear wheel brake and the at least one front wheel brake are in the form of an electromechanical wheel brake.

23. A motor vehicle having a braking system according to claim 7.

24. The method of operating a braking system according to claim 1, including controlling both the at least one rear wheel brake and the at least one front wheel brake by a control unit to perform the respective parking braking functions thereof when there is a requirement for parking braking.

25. A computer program product containing a program code stored on a computer-readable medium for carrying out a method according to claim 24.

26. A control unit for a braking system, comprising a computer program according to claim 25.

\* \* \* \* \*